(12) United States Patent
Welte et al.

(10) Patent No.: US 11,530,701 B2
(45) Date of Patent: Dec. 20, 2022

(54) PUMP COMPRISING AN ATTACHED GASKET

(71) Applicant: Schwäbische Hüttenwerke Automotive GmbH, Aalen-Wasseralfingen (DE)

(72) Inventors: Claus Welte, Aulendorf (DE); Uwe Meinig, Bad Saulgau (DE)

(73) Assignee: Schwäbische Hüttenwerke Automotive GmbH, Aalen (DE)

( * ) Notice: Subject to any disclaimer, the term of this patent is extended or adjusted under 35 U.S.C. 154(b) by 0 days.

(21) Appl. No.: 17/340,475

(22) Filed: Jun. 7, 2021

(65) Prior Publication Data

US 2021/0404467 A1    Dec. 30, 2021

(30) Foreign Application Priority Data

Jun. 25, 2020    (DE) ..................... 10 2020 116 731.8

(51) Int. Cl.
*F04C 15/00* (2006.01)
*F04C 15/06* (2006.01)
(Continued)

(52) U.S. Cl.
CPC .......... *F04C 15/0038* (2013.01); *F04C 15/06* (2013.01); *F04C 13/00* (2013.01);
(Continued)

(58) Field of Classification Search
CPC .. F04C 15/0038; F04C 15/06; F04C 15/0023; F01M 1/00
See application file for complete search history.

(56) References Cited

U.S. PATENT DOCUMENTS 4,596,519 A * 6/1986 Tuckey ................. F04C 15/068
                                                    418/133
4,662,827 A * 5/1987 Wiernicki ............. F04C 11/008
                                                    417/366
(Continued)

FOREIGN PATENT DOCUMENTS

DE    102015017078 A1    10/2016
WO      2010045906 A2     4/2010

OTHER PUBLICATIONS

German Search Report issued in German Patent Application No. 10 2020 116 731.8, dated May 10, 2021, 8 pages.

*Primary Examiner* — Deming Wan
(74) *Attorney, Agent, or Firm* — RatnerPrestia

(57) ABSTRACT

A pump for applying fluid, the pump including: a pump housing, including: a fluid inlet on a low-pressure side; an fluid outlet on a high-pressure side; a circumferential wall surrounding the pump delivery chamber; and an end-facing wall featuring an outer end-facing surface facing axially away from the delivery chamber and at which the outlet emerges; a delivery member, moveable in the delivery chamber, for delivering the fluid from the low-pressure side to the high-pressure side; a gasket including a gasket loop which surrounds the outlet to seal it off on the outer end-facing surface of the end-facing wall; a female joining element featuring an axially extending hollow space; and a male joining element protruding through or from the pump housing or the gasket. The male joining element is in a joining engagement, which can be subjected to axial tensile stress, with the female joining element in the hollow space.

17 Claims, 5 Drawing Sheets

(51) Int. Cl.
*F01M 1/00* (2006.01)
*F04C 13/00* (2006.01)
*F16H 57/04* (2010.01)

(52) U.S. Cl.
CPC ...... *F04C 2240/30* (2013.01); *F04C 2240/60* (2013.01); *F04C 2240/805* (2013.01); *F16H 57/0436* (2013.01)

(56) References Cited

U.S. PATENT DOCUMENTS

| | | | |
|---|---|---|---|
| 5,876,192 A | 3/1999 | Follmer | |
| 8,784,083 B2 | 7/2014 | Dippel | |
| 10,087,929 B2 * | 10/2018 | Welte | F04C 2/3446 |
| 2015/0125332 A1 * | 5/2015 | Rosenkranz | F04C 14/06 |
| | | | 418/246 |

* cited by examiner

PUMP COMPRISING AN ATTACHED GASKET

CROSS REFERENCE TO RELATED APPLICATIONS

This application claims benefit of priority to German Patent Application No. 10 2020 116 731.8, filed Jun. 25, 2020. The contents of this application are incorporated herein by reference.

FIELD OF THE INVENTION

The invention relates to the arrangement of a gasket on a pump. The invention relates in particular to the manner in which the gasket is held on a housing of the pump. The invention also relates to a pre-fitted pump unit and/or fitting unit. The pump can be used as a gear pump for supplying a transmission, for example an automatic transmission or steering transmission of a vehicle or a transmission of a wind turbine, with pressure fluid. In another application, it can be used as a lubricating oil pump and/or coolant pump for supplying a combustion engine and/or an electric motor, for example a drive motor of a vehicle, with lubricating oil and/or coolant. It is equally conceivable to use it as a combined lubricating oil pump and/or coolant pump and gear pump, in particular in embodiments in which the pump is a multi-flux pump. It is also conceivable for it to be embodied as a vacuum pump. The pump can be a mono-flux or multi-flux pump, in particular a multi-circuit pump. The pump can advantageously be embodied as a cartridge.

BACKGROUND OF THE INVENTION

Cartridge pumps which can be inserted as a fitting unit into an accommodating well of for example a transmission are known from the prior art. In the known pumps, gaskets are placed into the accommodating well, in part loosely, when fitted or are clamped on the pump housing in advance by the pump housing via a press fit or additional securing elements. When the gasket is fitted, detritus is often generated and/or other dirt particles are introduced, which either have to be removed by elaborate cleaning or can damage the pump or the unit to be supplied during operation.

Detritus and other dirt particles can also arise and/or be introduced when the gasket is removed, for example for the purpose of repairing individual pump parts, and will subsequently have to be thoroughly removed again.

SUMMARY OF THE INVENTION

An aspect of the invention is a pump which can be cost-effectively fitted and removed as a pre-fitted pump unit and/or fitting unit.

A pump in accordance with and aspect of the invention relates to comprises a pump housing featuring a delivery chamber which is surrounded by a circumferential wall and comprises an inlet for the fluid on a low-pressure side, at least one outlet for the fluid on a high-pressure side and a delivery member which can be moved within the delivery chamber for delivering the fluid from the low-pressure side to the high-pressure side. The delivery member is preferably formed by a delivery rotor which can be rotated, for example a rotor of a vane cell pump comprising at least one vane.

The delivery chamber is delineated in the axial direction by an end-facing wall. At least one pressure outlet for pressurized fluid delivered from the delivery chamber emerges on an outer end-facing side of the end-facing wall facing away from the delivery chamber. The pump comprises a gasket which is provided for sealing off the pressure outlet on the outer end-facing surface of the end-facing wall. The gasket comprises a gasket loop which surrounds the outlet on the outer end-facing surface of the end-facing wall. The gasket is preferably form as an axial gasket.

The pump housing comprises the circumferential wall and the end-facing wall (as a first end-facing wall) which can be produced as separate component parts or can be produced in one piece and together form a housing cup. The pump housing also comprises another, second end-facing wall which is arranged on the axial end-facing side of the circumferential wall facing away from the first end-facing wall. In preferred embodiments, the circumferential wall, the first end-facing wall and the second end-facing wall are produced separately and axially pressed against each other in a loose pressure contact.

When the pump is pre-fitted, the gasket is held on the pump housing by means of a joining engagement. For this purpose, the pump comprises a female joining element featuring an axially extending hollow space, and a male joining element which can be moved into a joining engagement which can be subjected to axial tensile stress. In order to establish the joining engagement, one of the joining elements is moved, relative to the pump housing and/or relative to the gasket, into contact with the other joining element. The joining engagement is based on a positive-fit and/or frictional-fit connection. A material-fit connection is not to be ruled out, although the joining engagement preferably does not involve a material-fit connection.

In advantageous embodiments, the pump housing and the gasket form a pre-fitted pump unit, i.e. a fitting unit. In such embodiments, the pump comprises a holding device featuring one or more holders, which ensures or jointly ensure that the pre-fitted components of the pump area held together. Preferably one or more or each of the holders (respectively) forms one of the joining elements for each joining engagement. The pre-fitted fitting unit comprises the circumferential wall, the end-facing wall, optionally the additional, second end-facing wall of the pump housing, the delivery member arranged in the pump housing and also the gasket held on the pump housing in the joining engagement of the joining elements. The holding device is preferably part of the pump housing.

The male joining element and the female joining element can be embodied as separate component parts from the gasket and/or the pump housing. Alternatively, the male joining element and/or the female joining element can be formed by the gasket and/or the pump housing, for example by a holder of the holding device or an end-facing wall. One of the joining elements can then for example be formed by the gasket or the pump housing, while the other joining element is formed as a separate component part. If one of the joining elements is part of the gasket and/or the pump housing, the joining element is preferably formed on a radially outer edge of the gasket and/or the end-facing wall of the pump housing.

The gasket is preferably in axial contact with one of the joining elements on a rear side facing axially away from the pump housing and is thus held on the pump housing. Preferably, one of the joining elements presses the gasket in the axial direction against the pump housing, by axial contact with a rear side of the gasket facing axially away from the pump housing.

The gasket preferably comprises a passage through which one of the joining elements, preferably the male joining element, can protrude axially. The passage can be formed on a radially outer edge of the gasket or on at least one tongue which protrudes radially outwards on an outer circumference of the gasket. In an axial view onto the end-facing wall, the tongue preferably overlaps a pressing device which will be described further below. The gasket preferably comprises multiple tongues which protrude outwards in an axial view onto the gasket, for example two radially opposite tongues, each comprising a passage for a joining element or a joining element which is formed in the respective tongue or fixedly joined to the respective tongue.

The axial extent of the hollow space of the female joining element is advantageously larger than the furthest radial extent of the hollow space. The hollow space preferably extends more than twice as far in the axial direction as in the radial direction. In advantageous embodiments, the hollow space of the female joining element extends further in the axial direction than the mean thickness of the gasket, wherein the mean thickness of the gasket is understood to mean the arithmetic mean over the possibly differing axial extent of the gasket over its entire surface.

If the female joining element is part of the pump housing, for example formed as a recess in the end-facing wall or, as is preferred, formed as a recess in a holder which protrudes through the end-facing wall, the hollow space preferably extends up to an opening which axially faces the gasket and is closed apart from the opening. It is preferably the case that the hollow space of the female joining element comprises an opening at a first axial end and a base at a second axial end. A section through the hollow space of the female joining element or through a part of the hollow space transverse to its axial direction is preferably circular, in particular substantially circular, but can also for example be elliptical or rectangular. Within the meaning of the present application, the expression "substantially circular" is in particular also understood to mean cross-sections which comprise a circular core, such as for example occur in a wedge-shaped toothed profile or a thread.

The hollow space of the female joining element preferably exhibits a substantially constant cross-section along its axial extent. The expression "substantially constant" is intended in particular to also encompass cross-sections of a thread which can deviate from each other over their axial length depending on the sectional plane. In alternative embodiments, the cross-section of the hollow space can change along its axial extent, for example in its shape and/or size. Particularly preferably, the hollow space of the female joining element is formed by a blind bore, in particular a circular blind bore.

The male joining element protrudes through the pump housing or the gasket and/or protrudes from the pump housing or the gasket. In preferred embodiments, the male joining element protrudes through the gasket in the axial direction. Particularly preferably, the male joining element protrudes through the gasket in the axial direction, towards the first end-facing wall. The male joining element preferably exhibits its furthest extent in the axial direction, i.e. the male joining element extends further in the axial direction than in the radial direction.

A section through the male joining element or through a part of the male joining element transverse to the axial direction of the male joining element preferably exhibits a substantially circular cross-sectional area, but can for example also be elliptical, annular or rectangular. Particularly preferably, the male joining element exhibits a cross-section which is complementary to the cross-section of the hollow space of the female joining element.

The male joining element preferably exhibits a variable cross-section along its axial extent; the cross-section can in particular change in its shape and/or size, in particular in steps, between a first part of the male joining element and a second part of the male joining element. Alternatively, the male joining element can exhibit a constant cross-section along its axial extent. In preferred embodiments, the male joining element comprises a shaft and a head.

The male joining element can be moved into a joining engagement, which can be subjected to axial stress, with the female joining element via the hollow space of the female joining element. In other words, the male joining element, in particular the shaft of the male joining element, protrudes at least partially into the hollow space of the female joining element and forms a joining engagement, which can be subjected to axial tensile stress, with the female joining element. The joining engagement can be formed as a positive-fit and/or force-fit connection. The joining engagement is advantageously embodied such that it can be released again. In particularly preferred embodiments, the joining engagement between the female joining element and the male joining element can be released without being destroyed.

A part of a joining element preferably protrudes through the passage of the gasket and together with another part forms an axial contact with the rear side of the gasket facing away from the pump housing. Particularly preferably, the shaft of the male joining element protrudes through the gasket, and its head presses axially against the gasket.

The male joining element preferably seals the hollow space of the female joining element, and/or its opening, in the joining engagement. By sealing the hollow space of the female joining element, the male joining element ensures that the detritus caused by the relative movement between the female joining element and the male joining element when fitted is pressed into the hollow space and enclosed in it.

Preferably, the male joining element seals the hollow space of the female joining element in the joining engagement by protruding at least partially into the hollow space. The male joining element or a part of the male joining element can span all or part of the hollow space of the female joining element in the axial direction, i.e. the male joining element or a part of the male joining element protrudes from the opening in the hollow space of the female joining element up to the end of the hollow space opposite the opening or protrudes from the opening in the hollow space towards the end opposite the opening, without reaching it.

In preferred embodiments, the male joining element comprises a shaft and a head, wherein the shaft protrudes axially through a passage of the gasket and into the hollow space of the female joining element, wherein the head of the male joining element is in contact with the rear side of the gasket facing axially away from the pump housing and presses the gasket against the pump housing.

The male joining element can form the joining engagement with the female joining element for example by means of a press-fit connection or pressure port. In the case of a press-fit connection or pressure port, the male joining element exhibits an excess over the hollow space of the female joining element, i.e. the male joining element is pressed or press-fitted into the hollow space of the female joining element.

The female joining element can then be fitted and/or pressed onto the male joining element, or the male joining element is fitted and/or pressed into the female joining element. In order to establish the joining engagement, the female joining element or the male joining element is moved towards the other joining element in each case.

The male joining element and the female joining element preferably form a screw engagement. For this purpose, the male joining element—in particular the shaft of the male joining element—comprises an external thread, and the hollow space of the female joining element comprises a corresponding internal thread. In the case of a screw connection, the male joining element and the female joining element preferably comprise a metric thread. The thread is in particular a metric thread smaller than M5.

In preferred embodiments, one of the joining elements—preferably, the female joining element—is formed or inserted in or on an end-facing wall, preferably the first end-facing wall, or protrudes into or through the end-facing wall, preferably in an axial sliding contact.

The female joining element and/or the hollow space of the female joining element can be introduced in the form of a bore, in particular a blind bore, in the holder or in the end-facing wall, in particular the first end-facing wall. In a preferred embodiment, the female joining element protrudes into the end-facing wall, in particular into a cavity in the end-facing wall, in an axial sliding contact and terminates, preferably flush, with it on the rear side facing away from the pump housing.

The male joining element can for example be a screw, a blind rivet, a threaded pin or a press-fit bolt and/or pin. The male joining element is preferably a standard part. The male joining element can for example be formed by an externally threaded pin, preferably one according to DIN EN ISO 4026, DIN EN ISO 4027, DIN EN ISO 4028 or DIN EN ISO 4029 in the version in force on the filing date of the application, and are incorporated herein by reference.

The female joining element, meanwhile, can for example be formed by a bore, in particular a blind bore, a nut, in particular a cap nut, or an internally threaded pin. The female joining element is preferably a standard part. Preferably, the male joining element and the female joining element are formed by standard parts. The female joining element can for example be formed by a nut, in particular a cap nut, or by a standard internally threaded pin, preferably one according to DIN EN ISO 8735 or DIN EN ISO 8733, and are incorporated herein by reference.

The female joining element is preferably part of the pump housing and positions the circumferential wall and the end-facing wall relative to each other in terms of their angular position, wherein the hollow space of the female joining element is provided on an end-facing side of the female joining element facing the gasket.

The circumferential wall can advantageously be connected to the first end-facing wall and/or the second end-facing wall via a holding device, in particular via at least one holder. The end-facing wall or walls is/are positioned relative to the circumferential wall in terms of their rotational angular position and held together by the holding device. The holder of the holding device is preferably formed by one of the joining elements, preferably the female joining element. For this purpose, a rod-shaped portion of one of the joining elements, preferably the female joining element, protrudes into or through the first end-facing wall and/or the second end-facing wall. In addition, a rod-shaped portion of one of the joining elements, preferably the female joining element, protrudes into or through the circumferential wall.

In particularly preferred embodiments, one of the joining elements—preferably, the female joining element—protrudes from the second end-facing wall and through the circumferential wall and first end-facing wall, wherein the female joining element can be formed together with the second end-facing wall or can be fixedly connected to the second end-facing wall as a separate component. The female joining element is preferably formed by a standard internally threaded pin, preferably one according to DIN EN ISO 8735 or DIN EN ISO 8733.

The pump housing can be (already) fitted, by means of a fitting structure, on an accommodating device provided at the fitting location. When it is said that the pump can be or is fitted "on" an accommodating device, this also includes fitting it within the accommodating device. The fitting structure can be part of the pump. It can be provided in addition to the pump housing or can be formed by one of the pump housing components mentioned, for example the first end-facing wall or the second end-facing wall. In alternative embodiments, a fitting structure can be provided as part of the accommodating device and thus provided externally in relation to the pump.

The accommodating device can in particular be a housing of a unit to be supplied with the pressure fluid, such as for example a transmission or a motor. When fitted, the first end-facing wall or the second end-facing wall—preferably, the first end-facing wall—lies axially opposite a connecting wall of the accommodating device. The connecting wall of the accommodating device can in particular be a base of an accommodating well for the pump. A pressure port, via which the pressure fluid flowing through the pressure outlet can be discharged, emerges at the connecting wall of the accommodating device. The gasket serves to establish a sealed fluid connection between the pressure outlet of the pump and the pressure port of the accommodating device.

The pump can comprise a pressing device for applying a pressing force to the outlet gasket and/or the pump housing. The pressing force acts on the outlet gasket in an axial direction away from the fitting structure, in order to press it into sealing contact with the connecting wall, and/or acts in an axial direction towards the pump housing in order to seal it off. The fitting structure can in particular be designed to absorb the reaction force acting in the opposite axial direction.

The pressing device is preferably formed by a mechanical spring and can in particular be a disc spring. The pressing device is preferably arranged on an end-facing wall of the pump housing, preferably the first end-facing wall, in the axial direction. The gasket can overlap the pressing device in an axial view onto the end-facing wall and grip behind the pressing device as viewed from the end-facing wall. In preferred embodiments, an outer circumference of the gasket comprises at least one tongue which protrudes radially outwards and overlaps the pressing device in an axial view onto the end-facing wall. In embodiments comprising a pressing device, in particular a spring, the gasket is preferably held on the pump housing by means of a joining connection, and the pressing device is preferably held on the pump housing by means of the gasket.

Using a gasket, in particular an axial gasket such as for example a bead gasket, to hold a pressing device, which is formed as a spring, on a pump housing can advantageously be combined with holding the gasket as claimed herein, but is conversely also advantageous for providing the pump as a pre-fitted pump unit, regardless of how the gasket is held.

The pump can for example be a linear stroke pump or, more preferably, a rotary pump. As a rotary pump, it can be an external-axle pump, for example an externally toothed wheel pump, or an internal-axle pump, for example a vane cell pump, an internally toothed wheel pump or a pendulum-slider pump. The delivery member can comprise a rotor which can be rotationally moved about a rotational axis in the delivery chamber and which serves to deliver the fluid from one or more inlets to one or more outlets. The rotor can advantageously serve to form delivery cells which periodically increase and decrease in size as the rotor rotates, in order to deliver the fluid from the low-pressure side of the pump to the high-pressure side of the pump.

If, as is preferred, the pump is arranged in a vehicle, the pump can be driven by the drive motor of the vehicle, for example an internal combustion engine or an electric motor. In hybrid vehicles, the pump can be driven either by the internal combustion drive engine or by the electric drive motor. In an advantageous modification, driving the pump can also be configured in such a way that the pump can be selectively driven by the internal combustion engine or by the electric motor or by both of them together. The internal combustion engine and the electric motor can then in particular drive the pump via a summing gear transmission.

Features of aspects of the invention are also described in the aspects formulated below. The aspects are worded in the manner of claims and can substitute for them. Features disclosed in the aspects can also supplement and/or qualify the claims, indicate alternatives with respect to individual features and/or broaden claim features. Bracketed reference signs refer to example embodiments of the invention illustrated below in figures. They do not restrict the features described in the aspects to their literal sense as such, but do conversely indicate preferred ways of implementing the respective feature.

Aspect 1. A pump for applying fluid to a unit, for example a transmission, the pump comprising:
1.1 a pump housing (1), comprising:
   an inlet (6) for the fluid on a low-pressure side;
   an outlet (8) for the fluid on a high-pressure side;
   a circumferential wall (2) which surrounds a delivery chamber (5) of the pump; and
   an end-facing wall (3) featuring an outer end-facing surface facing axially away from the delivery chamber (5) and at which the outlet (8) emerges;
1.2 a delivery member, which can be moved in the delivery chamber (5), for delivering the fluid from the low-pressure side to the high-pressure side;
1.3 a gasket (S) comprising a gasket loop (51) which surrounds the outlet (8) in order to seal it off on the outer end-facing surface of the end-facing wall (3);
1.4 a female joining element (13; 23; 33; 43) featuring an axially extending hollow space (14; 24; 34; 44); and
1.5 a male joining element (15; 25; 35; 45) which protrudes through or from the pump housing (1) or the gasket (S),
1.6 wherein the male joining element (15; 25; 35; 45) is in a joining engagement, which can be subjected to axial tensile stress, with the female joining element (13; 23; 33; 43) in the hollow space (14; 24; 34; 44), and
1.7 wherein the gasket (S) is in axial contact with one of the joining elements (13, 15; 43, 45) on a rear side facing axially away from the pump housing (1) and is thus held on the pump housing (1) and/or
1.8 the female joining element (23; 33; 43) is screwed or fitted onto the male joining element (25; 35; 45).

Aspect 2. The pump according to the preceding aspect, wherein the male joining element (15; 25; 35; 45) seals the hollow space (14; 24; 34; 44).

Aspect 3. The pump according to any one of the preceding aspects, wherein the hollow space (14; 24; 34; 44) extends up to an opening in the female joining element (13; 23; 33; 43) which axially faces the gasket (S), and the male joining element (15; 25; 35; 45) protrudes through the opening and seals it.

Aspect 4. The pump according to any one of the preceding aspects, wherein the hollow space (14; 24; 34; 44) extends up to an opening in the female joining element (13; 23; 33; 43) which axially faces the gasket (S) and is closed apart from the opening.

Aspect 5. The pump according to any one of the preceding aspects, wherein the hollow space (14; 24; 44) is a blind hole.

Aspect 6. The pump according to any one of the preceding aspects, wherein when establishing the joining engagement, one of the joining elements (15; 43) can be moved, relative to the pump housing (1) and/or relative to the gasket (S), into contact with the rear side of the gasket (S).

Aspect 7. The pump according to any one of the preceding aspects, wherein the joining element (15; 43) which is in axial contact with the rear side of the gasket (S) presses the gasket (S) axially against the pump housing (1).

Aspect 8. The pump according to any one of the preceding aspects, wherein one of the joining elements (13; 23; 35; 45)—preferably, the female joining element (13; 23)—is formed or inserted in or on the end-facing wall (3) or protrudes into and preferably through the end-facing wall (3), preferably in an axial sliding contact.

Aspect 9. The pump according to any one of the preceding aspects, wherein a rod-shaped portion of one of the joining elements (13; 23; 35; 45), preferably the female joining element (13; 23), protrudes into and preferably through the end-facing wall (3).

Aspect 10. The pump according to any one of the preceding aspects, wherein a rod-shaped portion of one of the joining elements (13; 23; 35; 45), preferably the female joining element (13; 23), protrudes into and preferably through the circumferential wall (2).

Aspect 11. The pump according to any one of the preceding aspects, wherein the circumferential wall (2) and the end-facing wall (3) are joined to each other, and one of the joining elements (13; 23; 35; 45), preferably the female joining element (13; 23), serves to position the end-facing wall (3) relative to the circumferential wall (2) in terms of its rotational angular position.

Aspect 12. The pump according to any one of the preceding aspects, wherein the male joining element (15; 35; 45) is a screw, a threaded pin, a blind rivet or a press-fit bolt and/or pin.

Aspect 13. The pump according to any one of the preceding aspects, wherein the male joining element (15) comprises a shaft and a head, the shaft protrudes axially through a passage of the gasket (S) and into the hollow space (14), and the head of the male joining element (15) presses axially against the gasket (S) and thus presses the gasket (S) against the pump housing (1).

Aspect 14. The pump according to any one of Aspects 1 to 8, wherein the male joining element (35) protrudes from the pump housing (1), and the gasket (S) is provided with the female joining element (33).

Aspect 15. The pump according to any one of Aspects 1 to 8, wherein the male joining element (35; 45) protrudes axially from the pump housing (1) and through the gasket (S), and the female joining element (33; 43) is a cap nut or a socket.

Aspect 16. The pump according to any one of the preceding aspects, wherein one of the joining elements (13; 23; 35; 45), preferably the female joining element (13; 23), is part of the pump housing (1).

Aspect 17. The pump according to any one of the preceding aspects, wherein the joining elements (13, 15; 43, 45) are in a screw engagement in the hollow space (14; 44).

Aspect 18. The pump according to any one of the preceding aspects, wherein at least one tongue (16) protrudes outwards on an outer circumference of the gasket (S), and the male joining element (15; 45) protrudes through the tongue (16).

Aspect 19. The pump according to any one of the preceding aspects, wherein the female joining element (13; 23) is part of the pump housing (1) and positions the circumferential wall (2) and at least one of the end-facing wall (3) and a second end-facing wall (4) relative to each other and axially holds them together by means of the joining engagement, wherein the hollow space (14; 24) is provided on an end-facing side of the female joining element (13; 23) facing the gasket (S).

Aspect 20. The pump according to the preceding aspect, wherein the second end-facing wall (4) and the circumferential wall (2) are joined or originally formed, for example cast, together and together form a housing cup.

Aspect 21. The pump according to the preceding aspect, wherein the female joining element (13; 23) is held in a cavity in the second end-facing wall (4) by a frictional-fit connection and protrudes through the circumferential wall (2).

Aspect 22. The pump according to any one of the preceding aspects, wherein the hollow space (14; 44) comprises an internal thread, preferably a metric internal thread, smaller than M5.

Aspect 23. The pump according to any one of the preceding aspects, wherein one (13; 45) of the joining elements in the joining engagement is formed in each case by a standard threaded pin.

Aspect 24. The pump according to any one of the preceding aspects, wherein the female joining element (13) is formed by an internally threaded standard pin, preferably one according to DIN EN ISO 8735 or DIN EN ISO 8733 in the version in force on the filing date of the application.

Aspect 25. The pump according to any one of the preceding aspects, wherein the male joining element (45) is formed by an externally threaded standard pin, preferably one according to DIN EN ISO 4026, DIN EN ISO 4027, DIN EN ISO 4028 or DIN EN ISO 4029 in the version in force on the filing date of the application.

Aspect 26. A pump for applying fluid to a unit, for example a transmission, the pump comprising:
  1.1 a pump housing (1), comprising:
    an inlet (6) for the fluid on a low-pressure side;
    an outlet (8) for the fluid on a high-pressure side;
    a circumferential wall (2) which surrounds a delivery chamber (5) of the pump; and
    an end-facing wall (3) featuring an outer end-facing surface facing axially away from the delivery chamber (5) and at which the outlet (8) emerges;
  1.2 a delivery member, which can be moved in the delivery chamber (5), for delivering the fluid from the low-pressure side to the high-pressure side;
  1.3 a spring (17) which is spring-elastic in the axial direction and which surrounds the outlet (8) on the outer end-facing surface of the end-facing wall (3); and
  1.4 a gasket (S) comprising a gasket loop (51) which surrounds the outlet (8) in order to seal it off on the outer end-facing surface of the end-facing wall (3),
  1.5 wherein the gasket (S) is held on the pump housing (1) by means of a joining connection, and the spring (17) is held on the pump housing (1) by means of the gasket (S).

Aspect 27. The pump according to the preceding aspect, wherein the spring (17) is arranged between the end-facing wall (3) and the gasket (S) in the axial direction, and the gasket (S) at least partially overlaps the spring (17) in an axial view onto the end-facing wall (3).

Aspect 28. The pump according to any one of the preceding two aspects, wherein at least one tongue (16) protrudes outwards on an outer circumference of the gasket (S), and the tongue (16) at least partially overlaps the spring (17) in an axial view onto the end-facing wall (3) and grips behind it as viewed from the end-facing wall (3).

Aspect 29. The pump according to any one of the preceding three aspects, wherein the spring (17) is formed by a disc spring.

Aspect 30. The pump according to any one of the preceding four aspects, wherein the joining connection which holds the gasket (S) on the pump housing (1) is formed in accordance with any one of Aspects 1 to 25.

Aspect 31. The pump according to any one of the preceding aspects, wherein the spring (17) according to Aspect 26 and/or the gasket (S) consists or each consist of metal, pure metal and/or one or more metal alloys.

BRIEF DESCRIPTION OF THE DRAWINGS

The invention is explained below on the basis of example embodiments. Features disclosed by the example embodiment advantageously develop the subject-matter of the claims, the subject-matter of the aspects and the embodiments explained above. There is shown:

DETAILED DESCRIPTION OF THE INVENTION

Figure 1:
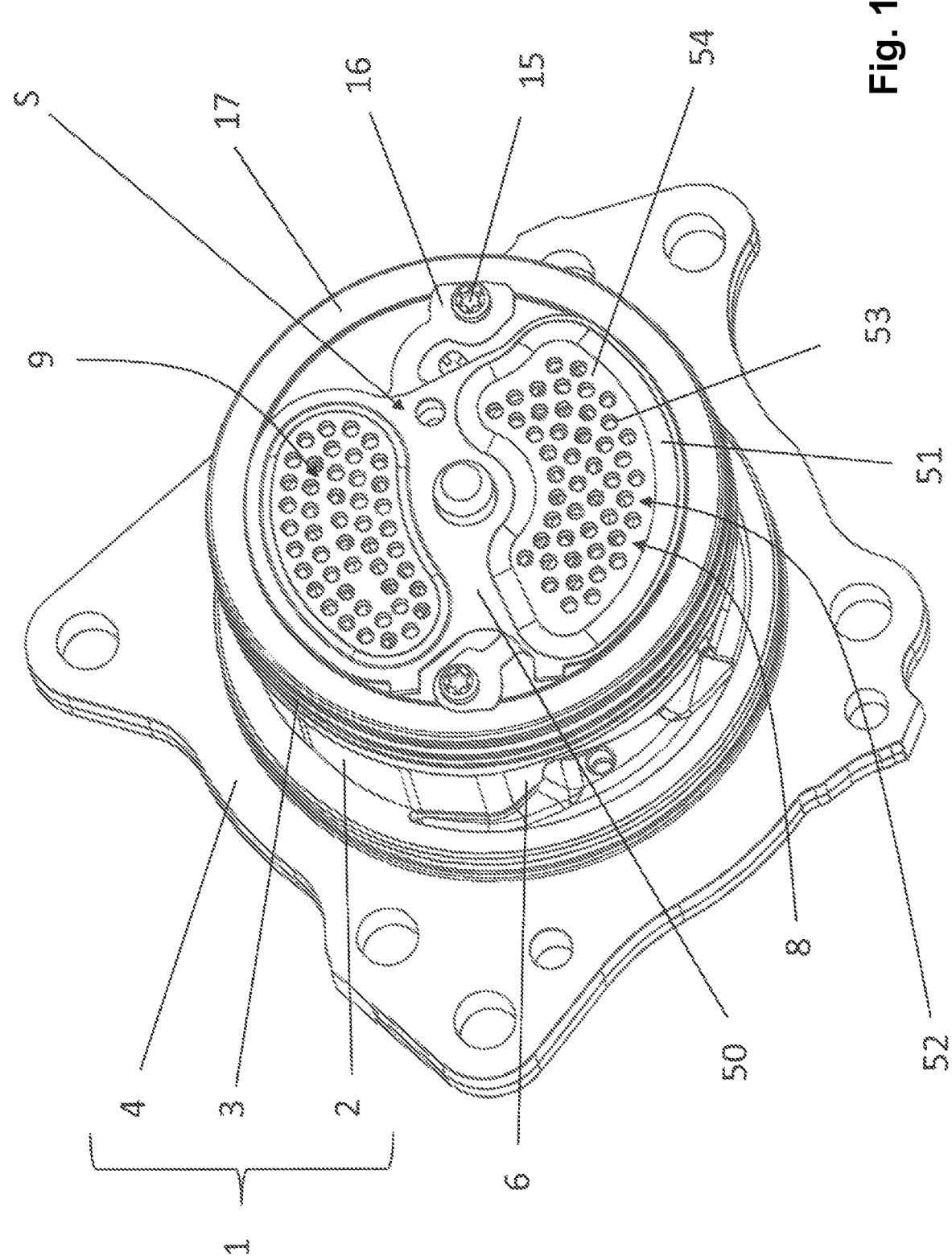
FIG. 1 an isometric view of a pump of a first example embodiment.

FIG. 1 discloses a pump of a first example embodiment in an isometric view. The pump comprises a pump housing 1 featuring a circumferential wall 2, a first end-facing wall 3 and a second end-facing wall 4. A fitting structure via which the pump can be fixed to an accommodating device, for example by means of screws, is formed on the second end-facing wall 4. The first end-facing wall 3 is formed on the side of the circumferential wall 2 facing away from the fitting structure. The circumferential wall 2, the first end-facing wall 3 and the second end-facing wall 4 are formed as separate components parts.

The pump is a dual-flux pump, i.e. it comprises a first working flux and a second working flux. The delivery chamber, which is not shown in more detail, correspondingly comprises a first inlet 6 and a first pressure outlet 8 for the first working flux and a second inlet and a second pressure outlet 9 for the second working flux. The delivery chamber is delineated in the radial direction by the circumferential wall 2. The delivery chamber is delineated axially on both sides by the first end-facing wall 3 and the second end-facing wall 4. The first inlet 6 and, radially opposite the first inlet 6 in the circumferential direction, the second inlet (not shown) are formed on the circumferential wall 2.

The circumferential wall 2 forms a closed ring, while the end-facing walls 3 and 4 are each plate-shaped. The two outlets 8, 9 emerge on an outer end-facing side of the first end-facing wall 3 facing away from the delivery chamber. The first outlet 8 and the second outlet 9 are surrounded by a gasket S, in particular a bead gasket comprising at least two bead loops. It may be noted at this juncture that an aspect of the invention is not restricted to dual-flux pumps and can also be used for example in a mono-flux pump comprising only one outlet.

The gasket S comprises multiple gasket loops 51 which, as is preferred but only by way of example, each encircle an inner region of the gasket S in the form of a bead loop. The gasket loop 51 surrounds an inner region 52 of the gasket S which lies axially opposite the first pressure outlet 8 and overlaps with it in an axial view. The gasket S also comprises at least a second gasket loop which surrounds an inner region of the gasket S which lies axially opposite the second pressure outlet 9 and overlaps with it in an axial view.

The first gasket loop 51 is stiffened as compared to conventional gasket loops—in this case, bead loops—in the inner region 52. It is stiffened by means of a first stiffening structure 54 which extends circumferentially from the inner edge of the gasket loop 51 into the inner region 52. The stiffening structure 54 is shaped as a flat, thin disc. It comprises a plurality of adjacently arranged passages 53 through which the fluid can flow when the pump is in operation. The stiffening structure 54 extends along the entire inner circumference of the gasket loop 51 and uniformly stiffens the gasket loop 51 radially inwards over its entire inner circumference. The passages 53 are circular passage bores, but in modifications can in principle also have other cross-sectional shapes, for example elongated, straight or curved slots.

The second gasket loop is also stiffened as compared to conventional gasket loops in the inner region. It is stiffened by means of a second stiffening structure which extends circumferentially from the inner edge of the gasket loop into the inner region. The stiffening structure is shaped as a flat, thin disc. It comprises a plurality of adjacently arranged passages through which the fluid can flow when the pump is in operation. The stiffening structure extends along the entire inner circumference of the gasket loop and uniformly stiffens the gasket loop radially inwards over its entire inner circumference. The passages are circular passage bores, but in modifications can in principle also have other cross-sectional shapes, for example elongated, straight or curved slots.

The first gasket loop 51 and the second gasket loop are arranged adjacently in the axial view, such that the corresponding inner regions 52 are also arranged adjacently and at a distance from each other. In the example embodiment, the gasket loops extend separately at a distance from each other. A central passage, which serves to center the gasket S on the pump housing 1, can be formed between the gasket loops.

The gasket S can be formed in one or more layers. In the present example, it comprises a first gasket layer 50. The first gasket loop 51 and the second gasket loop and also the first stiffening structure 54 and the second stiffening structure are part of the first gasket layer 50. If the gasket S is multi-layered, as in the example embodiments, it comprises a second gasket layer which for example forms an additional, third or fourth bead loop comprising a respective stiffening structure. If the gasket S comprises multiple gasket layers, these layers expediently lie one directly on top of the other. They can be joined to each other in a material-fit connection, for example by means of a welded or soldered connection or an adhesive connection.

Multiple—for example, two—tongues 16 which lie radially opposite each other and which each comprise a passage through which a male joining element 15 protrudes towards the first end-facing wall 3, are formed on the radially outer edge of the gasket S, in particular on the sealing layer 50. The tongues 16 are advantageously embodied in such a way that they at least partially axially overlap a pressing device 17 in the form of a mechanical spring, for example a disc spring. In this way, the gasket S is held on the pump housing 1 by means of a joining connection, and the pressing device 17 is held on the pump housing 1 by means of the gasket S.

Figure 2:
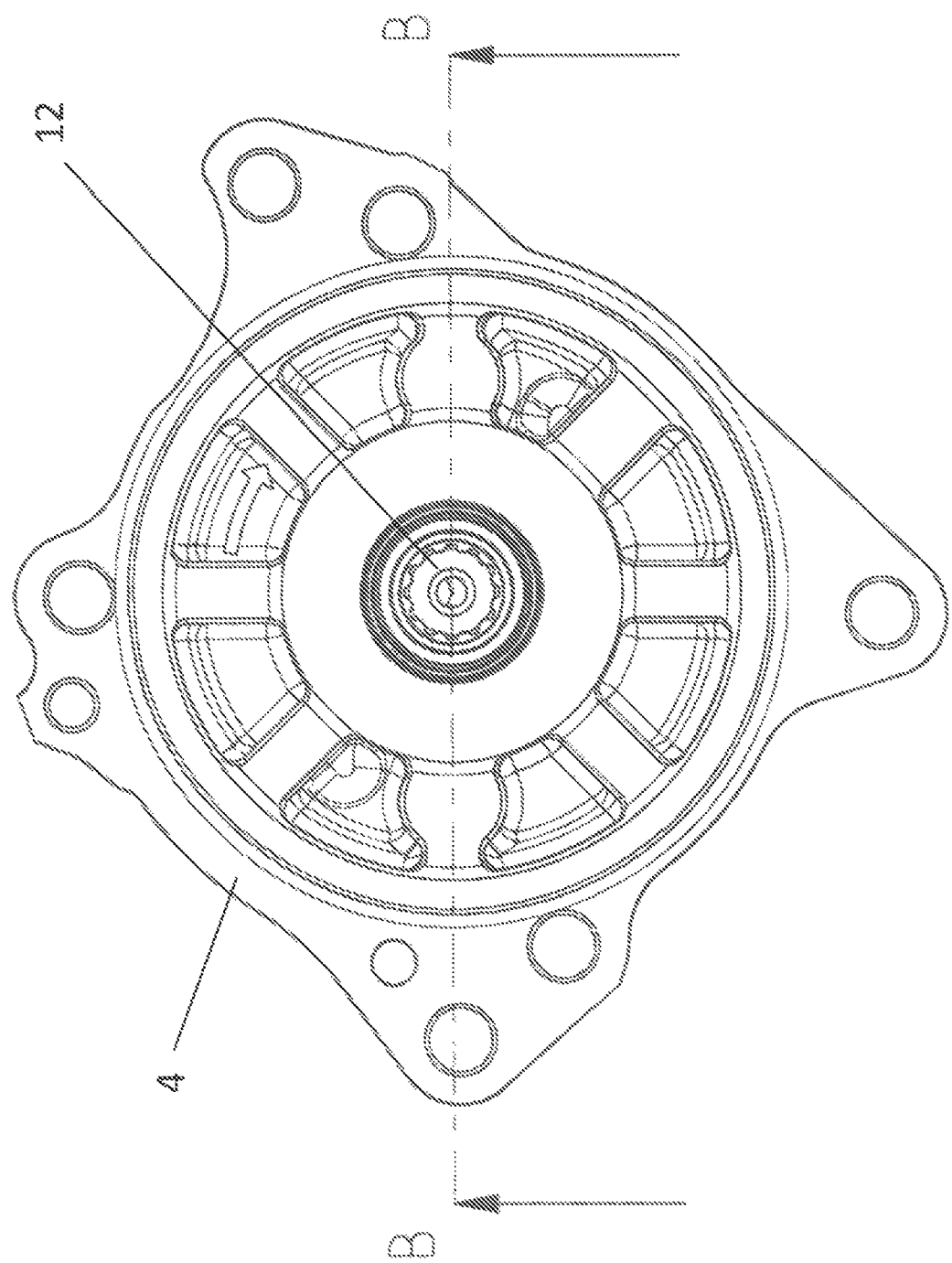
FIG. 2 the pump in a front view.

FIG. 2 shows a front view onto the second end-facing wall 4, wherein the fitting structure is formed by the second end-facing wall 4. The second end-facing wall 4 comprises a central passage for the drive shaft 12 of the rotor.

Figure 3:
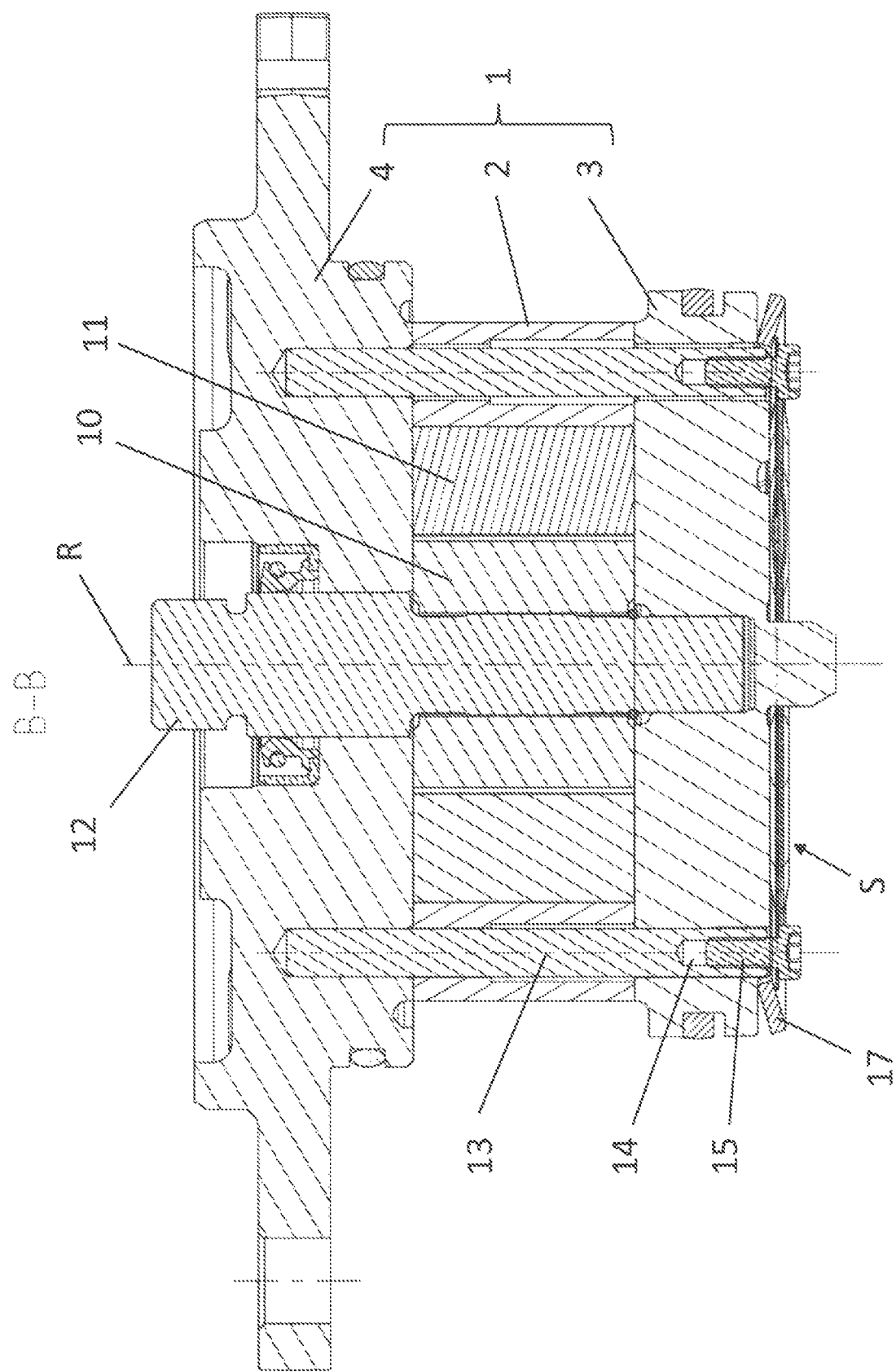
FIG. 3 the pump of the first example embodiment in a longitudinal section.

FIG. 3 is a longitudinal section B-B through the pump. A drive shaft 12 protrudes through the second end-facing wall 4 in the axial direction. The rotor 10 is connected non-rotationally to the drive shaft 12, such that rotating the drive shaft 12 about the rotational axis R causes the rotor 10 to rotate about the rotational axis R. The rotor 10 mounts at least one vane 11 such that it can move radially. It will be evident to the person skilled in the art that an aspect of the invention is not restricted to vane cell pumps of the present type and can also be used in other pumps.

The gasket S is in axial sealing contact with the end-facing surface of the first end-facing wall 3 facing axially away from the second end-facing wall 4. When the pump is fitted in or on an accommodating device, the first end-facing wall 3 lies axially opposite a connecting wall of the accommodating device, wherein the gasket S is arranged between the first end-facing wall 3 and the connecting wall of the accommodating device. When installed, the gasket S is also in sealing contact with the connecting wall of the accommodating device, such that when the pump is installed, the first outlet 8 is fluidically separated from the second outlet 9.

A female joining element 13 protrudes axially from the second end-facing wall 4 towards the first end-facing wall 3. The female joining element 13 serves to fix the gasket S on the pump housing 1 and can also serve to position the second end-facing wall 4 and the first end-facing wall 3 relative to the circumferential wall 2 in terms of their rotational angular position. The gasket S and the female joining element 13 in joining engagement with a male joining element also hold the pump housing 1 together. The female joining element 13 is fixedly connected to the second end-facing wall 4, for example by being press-fitted, thermally joined or screwed on.

The female joining element 13 protrudes from the second end-facing wall 4 and through both the circumferential wall 2 and the first end-facing wall 3. The female joining element 13 can protrude axially beyond the end-facing wall or more preferably can terminate flush with an outer end-facing surface of the end-facing wall 3 facing the gasket S or even more preferably can be short of said outer end-facing surface. The latter is implemented in the example embodiment.

The end of the female joining element 13 facing axially away from the second end-facing wall 4 comprises a hollow space 14 which extends axially towards the second end-facing wall 4 from the end-facing surface of the joining element 13 facing axially away from the second end-facing wall 4. In other words, the end-facing end of the joining element 13 which axially faces the gasket S comprises an opening and, adjoining it, the hollow space 14. The hollow space 14 comprises an internal thread, preferably a metric internal thread. The female joining element 13 is a standard internally threaded pin, preferably one according to DIN EN ISO 8735 or DIN EN ISO 8733.

The male joining element 15 is a screw which, together with the internal thread of the female joining element 13, forms the joining engagement in the form of a screw engagement.

Figure 4:
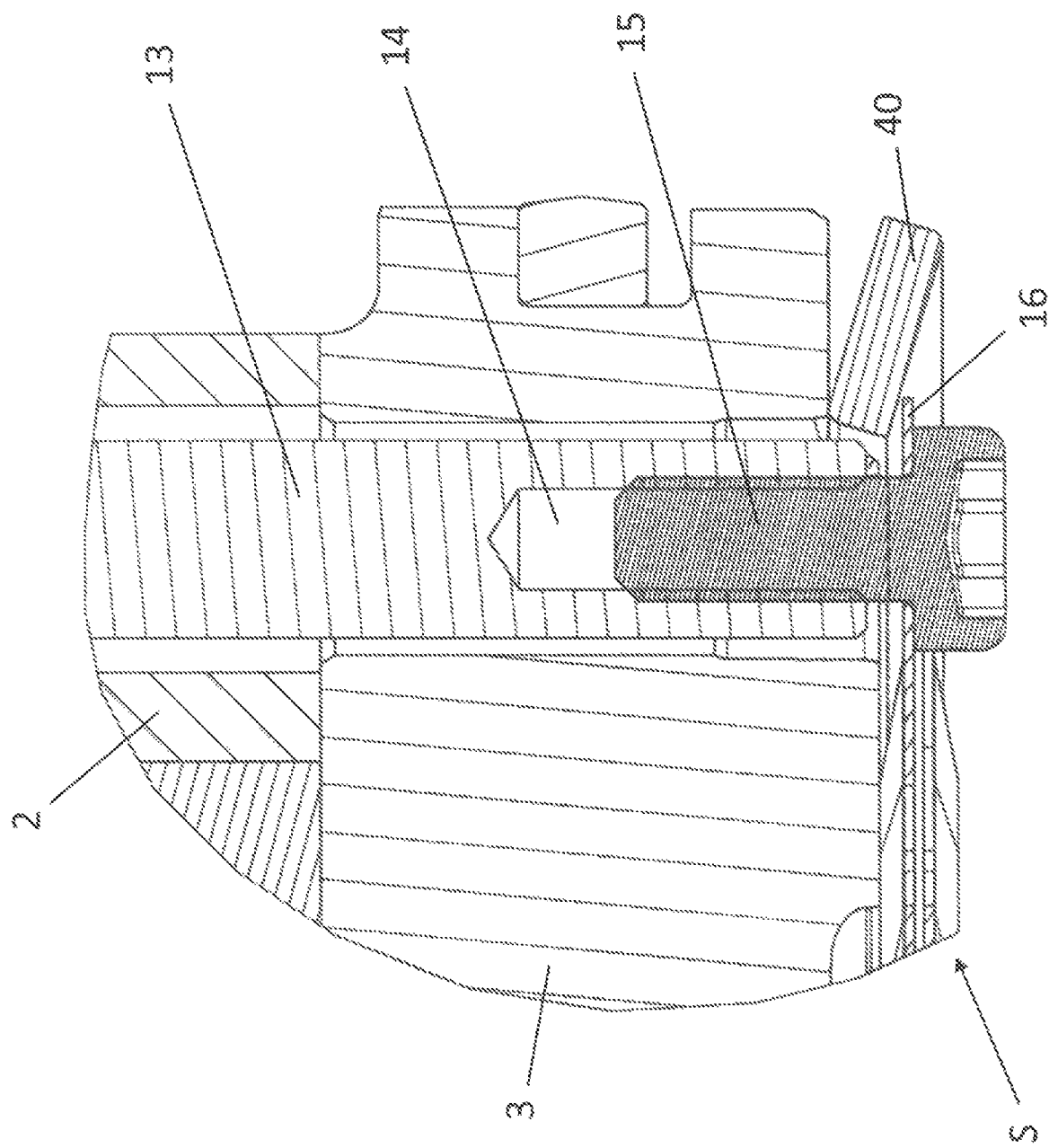
FIG. 4 a detailed view of a joining engagement in accordance with the first example embodiment.

FIG. 4 shows the screw engagement between the male joining element 15 and the female joining element 13 in detail, wherein the shaft of the male joining element 15 protrudes axially through a passage of the gasket S and into the hollow space 14 of the female joining element 13. The passage of the gasket S is provided on a radially outer edge of the gasket S and can in particular be formed in the region of the tongues 16. The head of the male joining element 15 presses axially against the gasket S, such that the gasket S is in axial contact with the male joining element 15 on a rear side facing axially away from the pump housing 1. The male joining element 15 tenses the gasket S axially against the pump housing 1.

The joining engagement is provided radially outside of the gasket loops 51 in an axial view onto the gasket S and therefore outside of the sealing contact with the end-facing wall 3 on the one hand and the connecting wall of the accommodating device, which lies axially opposite when the pump is fitted and is not shown in the figures, in each of the tongues 16 protruding radially outwards on the other. The tongues 16 are flexurally elastic and sufficiently flexible, such that fixing the gasket S on the pump housing 1, as effected by the joining engagement between the joining elements 13 and 15, does not impair the sealing contact.

The pressing device 17 is arranged axially between the first end-facing wall 3 and the gasket S, wherein the gasket S overlaps the pressing device 17 in an axial view onto the first end-facing wall 3 in a radially inner region of the pressing device 17 and thus grips behind it as viewed from the end-facing wall 3, preferably via the tongues 16. In this way, the pressing device 17 is held on the pump housing 1 by means of the gasket S. The pressing device 17 which is formed as a mechanical spring—in the example embodiment, as a disc spring—is formed so as to axially press together the housing walls 2, 3 and 4 of the pump housing 1 when the pump is fitted and so seal off the delivery chamber.

Figure 6:
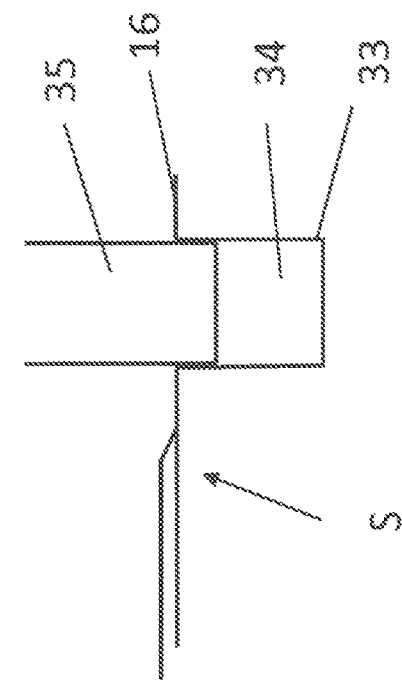
FIG. 6 a schematic view of a joining engagement of a third example embodiment.
Figure 7:
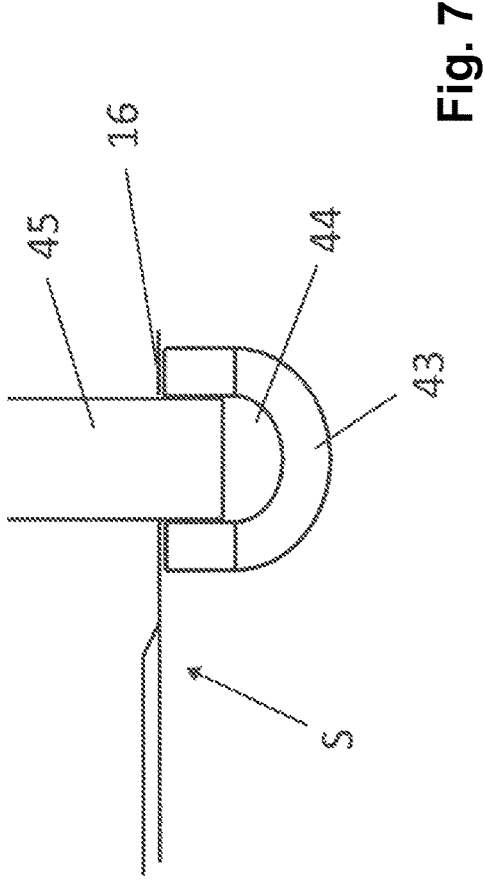
FIG. 7 a schematic view of a joining engagement of a fourth example embodiment.
Figure 5:
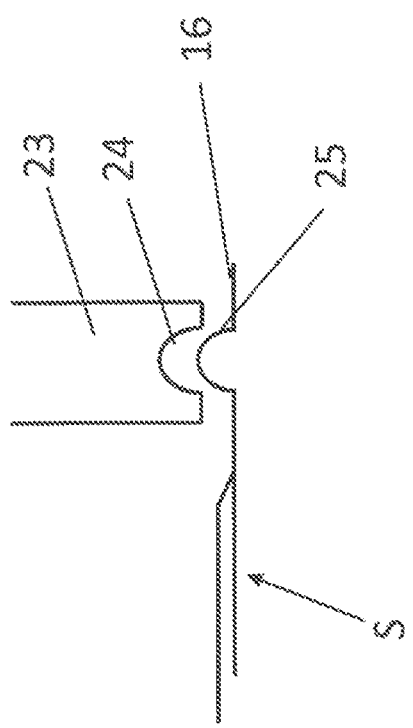
FIG. 5 a schematic view of a joining engagement of a second example embodiment.

FIGS. 5 to 7 schematically show other example embodiments of the joining engagement between a female and a male joining element in each case. Features of the first example embodiment, in particular those relating to the gasket S and the pump, also apply to the following example embodiments, unless expressly stated otherwise. Unless differences are described or are disclosed by the figures, the statements made above with respect to the first example embodiment also apply in the same way to the other example embodiments.

FIG. 5 shows a second example embodiment in which the male joining element 25 is formed by the gasket S and does not protrude through it, wherein the gasket S, in particular the tongues 16, exhibit(s) a convex curvature or bulge which protrudes from the gasket S towards the first end-facing wall 3 and/or the female joining element 23. Instead of a curvature or bulge, the male joining element of the gasket S can also be formed as a protruding pin, cam or the like.

The female joining element 23, meanwhile, comprises a concave hollow space 24 in relation to the first end-facing wall 3, into which the male joining element 25 can protrude in order to establish a joining engagement, wherein the hollow space can be formed directly on the first end-facing wall 3 or on a separate component part, for example a holding element 13 such as is shown in FIG. 4.

The hollow space 24 of the female joining element 23 is formed so as to be complementary to the bulge of the male joining element. The joining engagement between the male joining element 25 and the female joining element 23 is formed as a plug connection. The male joining element 25 has an excess over the hollow space 24 of the female joining element 23, such that the male joining element 25 can be pressed into the female joining element 23 and is held in the joining engagement, wherein the holding force with which the male joining element 25 is held in the joining engagement with the female joining element 23 is determined by the excess of the male joining element 25. FIG. 6 shows a joining engagement in a third embodiment in which the female joining element 33 is formed by the gasket S, wherein the gasket S, for example the respective tongue 16, forms the female joining element 35 by comprising a trough featuring a hollow space 34 which extends in a direction away from the first end-facing wall 3. The female joining element 33, i.e. the trough, is open towards the end-facing wall 3. The male joining element 35 protrudes from the first end-facing wall 3 and, in the joining engagement, into the female joining element 33. This joining engagement is likewise a plug connection. The male joining element 35 can be formed by the end-facing wall 3 itself or by a separate component part, for example a holder for the pump housing 1. The joining element 35 can then be an axial projection of the end-facing wall 3, i.e. formed directly on the end-facing wall 3. If the male joining element 35 is a separate component part, it can protrude through the end-facing wall 3, in accordance with the holders of FIG. 3. The respective holder of the first example embodiment can then for example also be lengthened and modified at the freely protruding end, to form the male joining element 35.

In order to form the joining engagement between the male joining element 35 and the female joining element 33, the female joining element 33 is fitted onto the male joining element 35. The male joining element 35 has an excess over the hollow space 34 of the female joining element 33, such that the male joining element 35 can be pressed into the female joining element 33 and is held in the joining engagement, wherein the holding force with which the male joining element 35 is held in the joining engagement with the female joining element 33 is determined by the excess of the male joining element 35.

A plug engagement is also understood to mean a snap or catch engagement between the joining elements in the manner of a push fastener connection. It is in principle advantageous if the respective plug engagement is configured such that the hollow space 24 and/or 34 is sealed by the male joining element 25 and/or 35 to the extent that any dirt particles which may be introduced are enclosed in the hollow space 24 and/or 34 and are not discharged when the pump is in operation.

FIG. 7 shows a fourth example embodiment of a joining engagement in which the male joining element 45 protrudes through a passage of the gasket S in a direction away from the first end-facing wall 3. The male joining element 45 protrudes from the first end-facing wall 3 and forms a joining engagement with the female joining element 43. The male joining element 35 can be formed by the end-facing wall 3 itself or by a separate component part, for example a holder for the pump housing 1. The joining element 45 can then be an axial projection of the end-facing wall 3, i.e. formed directly on the end-facing wall 3. If the male joining element 45 is a separate component part, it can protrude through the end-facing wall 3, in accordance with the holders of FIG. 3. The respective holder of the first example embodiment can then for example also be lengthened and modified at the freely protruding end, to form the male joining element 45.

The end of the male joining element 45 facing axially away from the second end-facing wall 4 (FIG. 3) comprises an external thread, in particular a metric external thread, wherein the male joining element 45 can comprise a thread in an axial end portion only or can be formed as a threaded pin which comprises a thread over its entire axial length. When embodied as a threaded pin, the male joining element 45 is preferably in a screw engagement with both the female joining element 43 and the second end-facing wall 4.

The female joining element 43 is formed as a nut, in particular a cap nut. When it is in joining engagement with the male joining element 45, the female joining element 43 presses axially against the gasket S, such that the gasket S is in axial contact with the female joining element 45 on a rear side facing axially away from the pump housing 1, and thus holds the gasket S on the pump housing 1.

In modifications of the fourth example embodiment, the male joining element and the female joining element which is provided separately from the gasket S can also be plug elements for establishing a plug engagement instead of a screw engagement.

In other modifications, joining elements in the form of screw elements, such as for example threaded pins and/or nuts, can be fixedly joined to the gasket S and preferably arranged on the tongues 16. The respective complementary screw element, such as for example the joining element 13 or the joining element 45, is axially fixed on the pump housing 1 in such embodiments, but rotatably connected to the pump housing 1 in order to be able to establish the joining engagement as a screw engagement.

REFERENCE SIGNS

1 pump housing
2 circumferential wall
3 first end-facing wall
4 second end-facing wall
5 delivery chamber
6 inlet
7 -
8 outlet
9 second outlet
10 rotor
11 vane
12 drive shaft
13 female joining element
14 hollow space
15 male joining element
16 tongue
17 spring
50 gasket layer
51 gasket loop
52 inner region
53 passages
54 stiffening structure
S gasket
R rotational axis

The invention claimed is:

1. A pump for applying fluid to a unit, the pump comprising:
    a pump housing, comprising:
        an inlet for the fluid on a low-pressure side;
        an outlet for the fluid on a high-pressure side;
        a circumferential wall which surrounds a delivery chamber of the pump; and
        an end-facing wall featuring an outer end-facing surface facing axially away from the delivery chamber and at which the outlet emerges;
    a delivery member, which is moveable in the delivery chamber, for delivering the fluid from the low-pressure side to the high-pressure side;
    a gasket comprising a gasket loop which surrounds the outlet in order to seal it off on the outer end-facing surface of the end-facing wall;
    a female joining element featuring an axially extending hollow space; and
    a male joining element which protrudes through or from the pump housing or the gasket,
    wherein the male joining element is in a joining engagement, which is axially tensile stressable, with the female joining element in the axially extending hollow space, and
    wherein the gasket is in axial contact with one of the joining elements on a rear side facing axially away from the pump housing and is thus held on the pump housing and/or
    the female joining element is screwed or fitted onto the male joining element,
    wherein the gasket serves to establish a sealed fluid connection between the pressure outlet of the pump and a pressure port of an accommodating device.

2. The pump according to claim 1, wherein the male joining element seals the axially extending hollow space.

3. The pump according to claim 1, wherein the axially extending hollow space is a blind hole.

4. The pump according to claim 1, wherein one of the joining elements is in axial contact with the rear side of the gasket and presses the gasket axially against the pump housing.

5. The pump according to claim 1, wherein the male joining element is a screw, a threaded pin, a blind rivet or a press-fit bolt or pin.

6. The pump according to claim 1, wherein the male joining element comprises a shaft and a head, the shaft protrudes axially through a passage of the gasket and into the axially extending hollow space, and the head of the male joining element presses axially against the gasket and thus presses the gasket against the pump housing.

7. The pump according to claim 1, wherein the hollow space comprises an internal thread smaller than M5, and the joining elements are in a screw engagement in the axially extending hollow space.

8. The pump according to claim 1, wherein at least one tongue protrudes outwards on an outer circumference of the gasket, and the male joining element protrudes through the tongue.

9. The pump according to claim 8, wherein the male joining element comprises a shaft and a head, the shaft protrudes axially through a passage of the gasket and into the axially extending hollow space, and the head of the male joining element presses axially against the gasket and thus presses the gasket against the pump housing.

10. The pump according to claim 1, wherein the female joining element is part of the pump housing and positions the circumferential wall and the end-facing wall relative to each other in terms of their rotational angular position, wherein the axially extending hollow space is provided on an end-facing side of the female joining element facing the gasket.

11. The pump according to claim 1, wherein the female joining element is formed by an internally threaded standard pin.

12. The pump according to claim 11, wherein the internally threaded standard pin is one according to DIN EN ISO 8735 or DIN EN ISO 8733.

13. A pump for applying fluid to a unit, the pump comprising:
- a pump housing, comprising:
  - an inlet for the fluid on a low-pressure side;
  - an outlet for the fluid on a high-pressure side;
  - a circumferential wall which surrounds a delivery chamber of the pump; and
  - an end-facing wall featuring an outer end-facing surface facing axially away from the delivery chamber and at which the outlet emerges;
- a delivery member, which is moveable in the delivery chamber, for delivering the fluid from the low-pressure side to the high-pressure side;
- a spring which is spring-elastic in the axial direction and which surrounds the outlet on the outer end-facing surface of the end-facing wall; and
- a gasket comprising a gasket loop which surrounds the outlet in order to seal it off on the outer end-facing surface of the end-facing wall,
wherein the gasket is held on the pump housing by means of a joining connection, and the spring is held on the pump housing by means of the gasket, and wherein joining connection is formed in accordance with claim 1.

14. A pump for applying fluid to a unit, the pump comprising:
- a pump housing, comprising:
  - an inlet for the fluid on a low-pressure side;
  - an outlet for the fluid on a high-pressure side;
  - a circumferential wall which surrounds a delivery chamber of the pump; and
  - an end-facing wall featuring an outer end-facing surface facing axially away from the delivery chamber and at which the outlet emerges;
- a delivery member, which is moveable in the delivery chamber, for delivering the fluid from the low-pressure side to the high-pressure side;
- a spring which is spring-elastic in the axial direction and which surrounds the outlet on the outer end-facing surface of the end-facing wall; and
- a gasket comprising a gasket loop which surrounds the outlet in order to seal it off on the outer end-facing surface of the end-facing wall,
wherein the gasket is held on the pump housing by means of a joining connection, and the spring is held on the pump housing by means of the gasket.

15. The pump according to claim 14, wherein the spring is arranged between the end-facing wall and the gasket in the axial direction, and the gasket overlaps the spring in an axial view onto the end-facing wall.

16. The pump according to claim 14, wherein at least one tongue protrudes outwards on an outer circumference of the gasket, and the tongue overlaps the spring in an axial view onto the end-facing wall.

17. The pump according to claim 14, wherein the spring is formed by a disc spring.

* * * * *